United States Patent
Konno et al.

(10) Patent No.: US 6,730,283 B2
(45) Date of Patent: May 4, 2004

(54) PREPARATION OF FINE β-SILICON CARBIDE POWDER

(75) Inventors: Hidetaka Konno, Sapporo (JP); Mikio Aramata, Annaka (JP); Hirofumi Fukuoka, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 201 days.

(21) Appl. No.: 10/096,849

(22) Filed: Mar. 14, 2002

(65) Prior Publication Data

US 2003/0072704 A1 Apr. 17, 2003

(30) Foreign Application Priority Data

Mar. 14, 2001 (JP) ........................................ 2001-072349

(51) Int. Cl.[7] .............................................. C01B 31/36
(52) U.S. Cl. ..................................................... 423/345
(58) Field of Search ................................. 423/345, 347

(56) References Cited

U.S. PATENT DOCUMENTS 5,358,910 A * 10/1994 Atwell et al. ................. 501/88

FOREIGN PATENT DOCUMENTS

| JP | 61-6110 A | 1/1986 |
|---|---|---|
| JP | 1-42886 B2 | 9/1989 |
| JP | 6-183718 | 7/1994 |

* cited by examiner

*Primary Examiner*—Stanley S. Silverman
*Assistant Examiner*—Edward M. Johnson
(74) *Attorney, Agent, or Firm*—Birch, Stewart, Kolasch & Birch, LLP

(57) ABSTRACT

A fine β-silicon carbide powder is prepared by impregnating graphite with an organosilicon compound selected from crosslinkable silanes and siloxanes, causing the organosilicon compound to crosslink within the graphite, and heating at 1,300° C. or higher in an inert gas stream for reaction. Using only low-temperature heat treatment in air and high-temperature heat treatment in inert gas, the invention enables industrial, economical manufacture of fine silicon carbide powder in a stable manner.

4 Claims, 3 Drawing Sheets

PREPARATION OF FINE β-SILICON CARBIDE POWDER

This invention relates to the preparation of fine β-silicon carbide powder useful as heat resistant material, pyrogenic material, structural material, and abrasive material.

BACKGROUND OF THE INVENTION

Several methods are known in the art for the preparation of silicon carbide powder. Typical methods include (1) reductive carbonization of silica and carbon, (2) direction reaction of metallic silicon with carbon, (3) pyrolysis of organosilicon compounds, and (4) gas phase reaction.

Of these methods, the reductive carbonization method (1) and the direct reaction method (2) produce silicon carbide powder composed mainly of coarse particles. When this silicon carbide powder is used as sintering material or in abrasive application, it must be ground and classified to a finer size, which steps require much labors. Even after such grinding, the resulting silicon carbide powder is not yet regarded adequate to the relevant application. The gas phase reaction method (4) starts with such raw materials as $SiH_4$, $SiCl_4$ and $CH_4$ which are expensive. Since the current technology is low in yield, the product powder is costly. For the most part, the silicon carbide powder obtained by this method is used only in the thin film and single crystal-forming application and not suited as industrial powder materials. As a consequence, the method (3) involving pyrolysis of organosilicon compounds is considered most potential for the preparation of silicon carbide powder, with a number of studies having been made thereon. For example, JP-B 1-42886 discloses a method for preparing silicon carbide powder by uniformly liquefying a liquid silicon compound, a liquid organic compound having a functional group and capable of forming carbon upon heating, and a polymerization or crosslinking catalyst, effecting polymerization or crosslinking reaction to form a precursor containing Si, O and C, and heating the precursor in a non-oxidizing atmosphere. In JP-A 61-6110, silicon carbide powder is prepared by adding a siliceous solid and a carbonaceous solid to a liquid silicon compound and an organic compound having a functional group to form a precursor solid, followed by firing and carbonization of the precursor solid. The method of JP-A 6-183718 involves furnishing a liquid silicon compound and a liquid organic compound having a functional group and capable of forming carbon upon heating as starting materials, adding a polymerization or crosslinking catalyst thereto, effecting polymerization or crosslinking reaction to form a precursor, and firing in two stages the precursor in a non-oxidizing atmosphere, thereby producing β-type silicon carbide powder.

The above-referred methods relying on pyrolysis of organosilicon compounds, however, are still not satisfactory from the industrial standpoint. More particularly, the method of JP-B 1-42886 uses a silane or siloxane having a functional group (e.g., hydrolyzable group such as alkoxy) as the starting material. An organic compound having a functional group, typically a phenolic resin giving a large amount of residual carbon is used as the carbon source. The silane or siloxane and the organic compound are subjected to heat polymerization or catalytic polymerization, followed by heating in a non-oxidizing atmosphere. Silicon carbide is produced in two steps. Basically, this method produces silicon carbide by way of silicon dioxide. Even if silicon carbide is ideally produced most simply by reacting silicon dioxide with carbon as shown by the following scheme, the yield based on the reactants ($SiO_2$ and C) is only 42% at the maximum.

$SiO_2$ (s)+C (s)→SiO (g)+CO (g)

SiO (g)+2C (s)→SiC (s)+CO (g)

Actually, while reaction proceeds as shown by the scheme, a substantial loss occurs with SiO (g) having a high vapor pressure, resulting in a further reduced yield. If the yield is calculated based on the starting material, silane or siloxane, the yield is apparently far below this level. Additionally, this method is cumbersome in that it requires two stages, polymerization step and firing step for carbonization into silicon carbide.

The method of JP-A 61-6110 proceeds by way of a liquid compound resulting from acidolysis or alkali-removal reaction of an aqueous alkali silicate solution or an esterified product of the liquid compound with an organic compound having a hydroxyl group such as a phenolic resin. This is mixed with silicon dioxide and organic coke powder to form a solid which is fired. In this sense, the method is basically identical with the above-discussed method of JP-B 1-42886 and suffers from low yields and cumbersome operation.

The method of JP-A 6-183718 is identical with the foregoing methods in that a mixture of an organosilicon compound such as tetraethoxysilane and an organic resin such as a phenolic resin as a reducing agent is used as the starting material, and a condensation product thereof is formed as the precursor. This method is distinguishable in that silicon carbide having a higher purity can be produced by using a high purity silane for semiconductor use as the starting material and adding a halide such as hydrogen chloride during the firing step. It suffers from low yields and cumbersome operation as well.

SUMMARY OF THE INVENTION

An object of the invention is to provide a method for preparing β-silicon carbide powder through simple steps, at a low cost and in high yields.

Surprisingly, we have found that by impregnating graphite with at least one organosilicon compound selected from crosslinkable silanes and siloxanes, forming a crosslinked product of the organosilicon compound within the graphite, and heating at a temperature of 1,300° C. or higher in an inert gas stream for reaction, dense silicon carbide is produced in a high yield based on the starting material (i.e., organosilicon compound).

More specifically, according to the inventive method, the liquid or gaseous organosilicon compound having functional groups is converted into a high density crosslinked structure having silicon-to-carbon bonds through hydrosilylation or similar reaction, thereby overcoming the problem inherent to the use of such organosilicon compounds as the starting material that the organosilicon compound will volatilize during firing in a non-oxidizing gas stream. Establishing an ideal production route using carbon itself as a reducing agent and as a carbon source for silicon carbide, we have arrived at the present invention.

DESCRIPTION OF THE PREFERRED EMBODIMENTS

Figure 1:
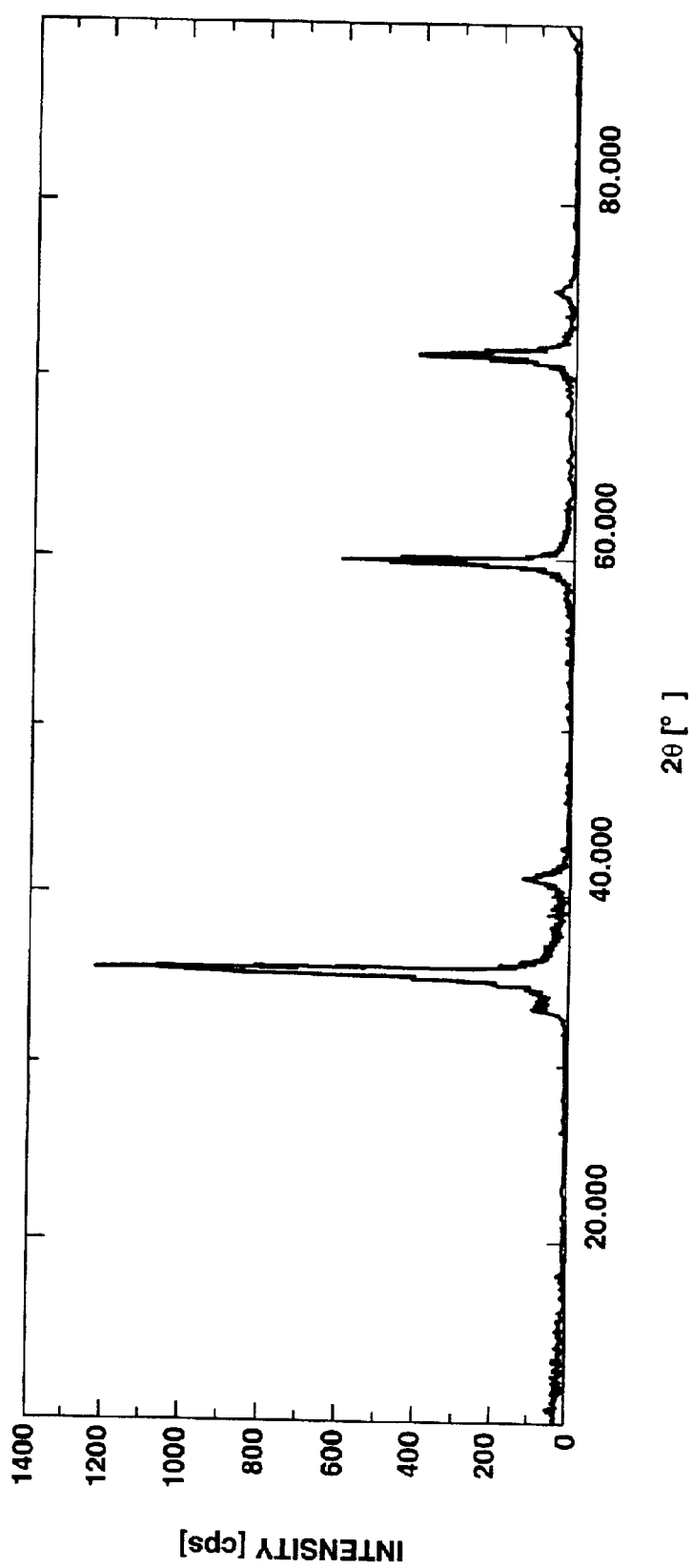
FIGS. 1 and 2 are x-ray diffraction and NMR charts of β-SiC in Example 1, respectively.

According to the invention, a β-silicon carbide powder is prepared by using one or more organosilicon compounds selected from crosslinkable silanes and crosslinkable siloxanes as the starting material, impregnating graphite with the organosilicon compound, causing the organosilicon compound to crosslink within the graphite, and heating the crosslinked organosilicon compound-bearing graphite at a temperature of 1,300° C. or higher in an inert gas stream for reaction.

The starting material used herein is a crosslinkable silane or siloxane. If it does not form a crosslinked product and remains as a chain-like polymer within graphite, it is likely to volatilize off by heating in a non-oxidizing gas stream because its backbone linkage is readily thermally cleaved and decomposed into low molecular weight moieties, e.g., cyclic oligomers of 3 to 6 monomeric units. By contrast, since silicon-to-carbon bonds resulting from hydrosilylation reaction are resistant to heat, the highly crosslinked compound is unlikely to be decomposed into low molecular weight moieties, and even when decomposed, hinders volatilization due to the high degree of crosslinking. As a result, the firing step effectively converts it into silicon carbide without volatilization.

Any desired silanes and siloxanes may be used herein as long as they have in a molecule two or more crosslinkable functional groups attached to silicon atoms, such as alkenyl groups, hydroxyl groups, hydrogen atoms, and hydrolyzable groups. Two or more of such silanes and siloxanes may be used in combination. With respect to the molecular structure, they may be linear, branched or cyclic. Illustrative examples include linear organopolysiloxanes of the general formula (1), cyclic organopolysiloxanes of the general formula (2), and silane and silicone resins of the general formula (3), shown below.

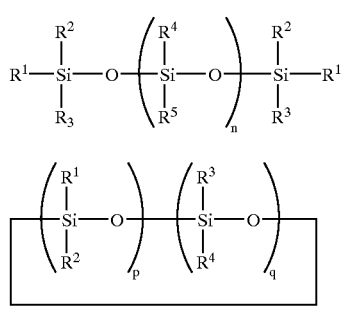

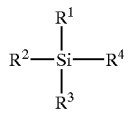

In the formulae, $R^1$ to $R^5$ are independently selected from hydrogen, hydroxyl, hydrolyzable groups, alkenyl groups having 2 to 8 carbon atoms, and substituted or unsubstituted monovalent hydrocarbon groups having 1 to 10 carbon atoms and free of aliphatic unsaturation (e.g., alkyl, aryl and aralkyl groups).

The silane or siloxane used herein should have in a molecule at least two hydrogen atoms, hydrolyzable groups (e.g., hydroxyl, alkoxy and acyloxy), or alkenyl groups, each attached to a silicon atom. In formula (1), n is a number of 0 to 2,000, preferably 0 to 1,000, and more preferably 0 to 500. In formula (2), p+q is preferably 3 to 10. The silicone resins are branched siloxanes having $R^1SiO_{3/2}$ units in a molecule. Of the silicone resins, solid resins are used as a solution thereof in a solvent.

As mentioned above, two or more of the silanes and siloxanes may be used in combination. Preferred combinations include a combination of a silane or siloxane having at least two alkenyl groups (e.g., vinyl and allyl) attached to silicon atoms in a molecule with another silane or siloxane having at least two hydrogen atoms attached to silicon atoms (i.e., SiH groups) in a molecule, which combination is crosslinkable through hydrosilylation reaction; and a combination of a silane or siloxane having at least two hydroxyl groups attached to silicon atoms in a molecule with another silane or siloxane having at least two hydrolyzable groups (e.g., alkoxy and acyloxy) attached to silicon atoms in a molecule, which combination is crosslinkable through condensation reaction. To the former combination, a catalytic amount of an addition reaction catalyst such as platinum group catalyst is added. A catalytic amount of a condensation catalyst such as organometallic is added to the latter combination.

On use of these crosslinkable combinations (crosslinkable silanes and siloxanes), after graphite is impregnated with them, they are cured through heat curing or catalytic reaction. The silicone resins do not need the catalyst. Of these, the combinations of organosilicon compounds capable of crosslinking through hydrosilylation reaction, and the silicone resins are especially preferred.

The preferred silane or siloxane (organosilicon compound) used herein as the starting material has the average formula:

wherein a and b are positive numbers and c is 0 or a positive number, satisfying a−c≧0.8. The reason is given below.

Since the reaction to form silicon carbide according to the invention takes place according to the following scheme:

the theory requires n−p=1. However, graphite contributes as the carbon source too and hydrosilylation reaction entails some losses. Then silanes or siloxanes wherein (n–p) is equal to or more than 0.8, or mixtures thereof are preferred. More preferred are silanes or siloxanes wherein (n–p) is from 0.9 to 1.5, especially from 1.0 to 1.2, or mixtures thereof. If (n–p) is less than 0.8, the starting material has so high a proportion of oxygen that oxygen may be left in the resultant silicon carbide. Inversely, if (n–p) is more than 1.5, unreacted carbon may remain admixed in the resultant silicon carbide.

In the above average formula, a is preferably from 0.8 to 20, especially from 1 to 10, b is preferably from 1 to 40, especially from 1 to 20, and b/a is preferably from 1 to 5, especially from 1 to 4.

According to the invention, after graphite is impregnated with the starting material, the material is cured by heat curing or catalytic reaction into a highly crosslinked product if the starting material is a crosslinkable combination as mentioned above. The graphite to be impregnated is not critical as long as it is porous. From the productivity and efficiency standpoints, it is preferred to use expanded graphite capable of absorbing or adsorbing a several ten fold quantity of an oily liquid. The impregnation of graphite with the silane or siloxane may be carried out by using a solution of the silane or siloxane dissolved in or diluted with a suitable solvent. The crosslinking can be induced by a conventional technique under ordinary conditions, depending on whether the type of crosslinking is hydrosilylation, condensation or other reaction.

Next, the highly crosslinked material is heated and reacted at a temperature of 1,300° C. or higher, preferably 1,400° C. or higher, more preferably 1,500° C. or higher, in an inert gas atmosphere. At a reaction temperature below 1,300° C., pyrolytic reaction does not take place. The upper limit of the reaction temperature is not critical though it is preferably 2,500° C., especially 2,000° C.

Preferably, the heating step is carried out in the presence of a catalyst which is a metal of Group VIII in the Periodic Table or a compound thereof. The Group VIII metals are preferably platinum and rhodium, with platinum being most preferred. The amount is a catalytic amount and preferably 1 to 2,000 ppm, especially 10 to 500 ppm.

When hydrosilylation reaction is utilized in forming the crosslinked product of the organosilicon compound, the platinum group catalyst is often used for that reaction and if it is not removed, it may work effectively in the heating step as well.

The atmosphere is not critical as long as it is not reactive with the organosilicon compound. Inert gases such as Ar and He and vacuum are often used.

The method may be carried out either continuously or batchwise. More particularly, any of a fluidized bed reactor, rotary furnace, vertical moving bed reactor, tunnel furnace and batch furnace may be used depending on a particular purpose.

EXAMPLE

Examples of the invention are given below by way of illustration and not by way of limitation. It is noted that Me is methyl and Ph is phenyl.

Example 1

Figure 2:
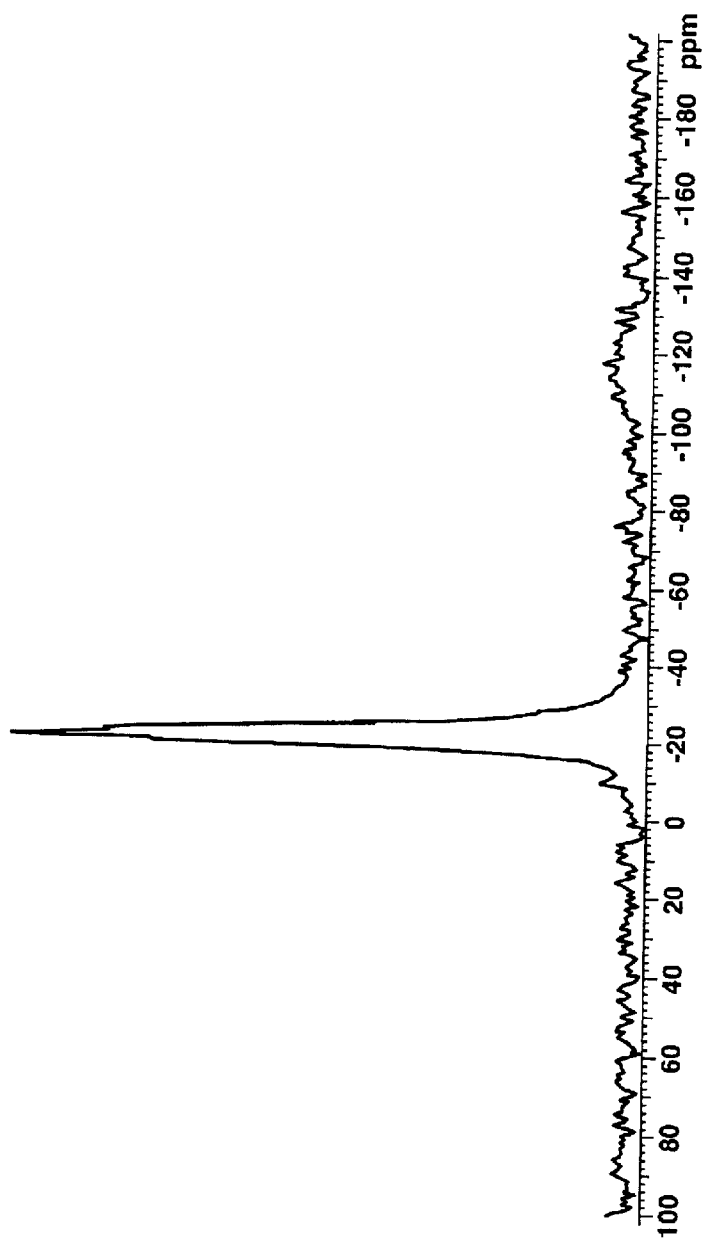
Figure 3:
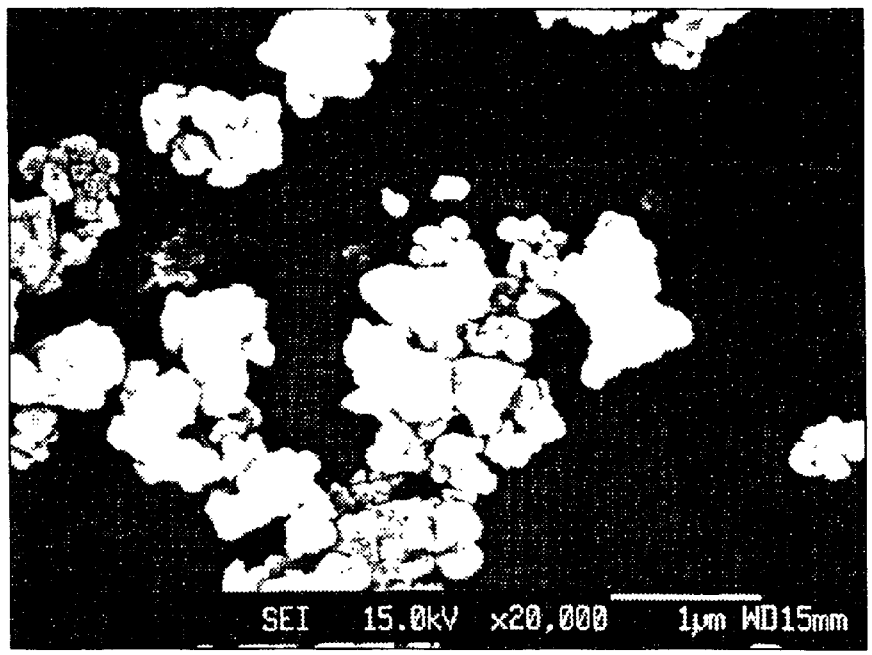
FIGS. 3 and 4 are SEM photomicrographs of β-SiC in Examples 1 and 4.

In 100 ml of toluene was dissolved a mixture of 43.0 g of tetramethyltetravinylcyclotetrasiloxane (LS-8670 by Shin-Etsu Chemical Co., Ltd.), 31.0 g of methylhydrogensiloxane (KF-99 by Shin-Etsu Chemical Co., Ltd.) and 0.5 g of a chloroplatinic acid catalyst (1% solution of chloroplatinic acid). To this solution was added 2.05 g of expanded graphite. The impregnated graphite was dried in a vacuum oven at 100° C. for about 30 minutes and then heated in air at 300° C. for one hour for heat curing. This was heated to 1,600° C. in an argon stream at a rate of about 300 K/hr, held at the temperature for one hour, then cooled at a rate of about 200 K/hr. There was obtained 35.5 g of a grayish white product in a yield of about 48% based on the siloxane weight. The results of chemical analysis of this product are shown in Table 1. From these analytical results and the charts of x-ray diffraction (FIG. 1) and solid NMR analysis (FIG. 2), the product was identified to consist essentially of β-SiC. From the SEM photomicrograph (FIG. 3) and particle diameter measurement, the product was found to be fine particles having an average particle diameter of about 0.5 μm.

Example 2

To a mixture of 43.0 g of tetramethyltetravinylcyclotetrasiloxane (LS-8670 by Shin-Etsu Chemical Co., Ltd.), 31.0 g of methylhydrogensiloxane (KF-99 by Shin-Etsu Chemical Co., Ltd.) and 0.5 g of a chloroplatinic acid catalyst (1% solution of chloroplatinic acid) was added 1 g of acetylene alcohol as an agent for controlling the platinum catalyst. Immediately thereafter, 2.0 g of expanded graphite was added to the solution. The impregnated graphite was heated in air at 300° C. for one hour for heat curing. This was heated to 1,600° C. in an argon stream at a rate of about 300 K/hr, held at the temperature for one hour, then cooled at a rate of about 200 K/hr. There was obtained 34.8 g of a grayish white product in a yield of about 47% based on the siloxane weight. The results of chemical analysis of this product are shown in Table 1. From these analytical results and the charts of x-ray diffraction and solid NMR analysis, the product was identified to consist essentially of β-SiC. From the SEM photomicrograph and particle diameter measurement, the product was found to be fine particles having an average particle diameter of about 0.5 μm.

Example 3

In 100 ml of toluene was dissolved a mixture of 47.0 g of tetramethyldivinyldisiloxane [$(CH_2=CH)(CH_3)_2Si]_2O$, 30.0 g of methylhydrogensiloxane (KF-99 by Shin-Etsu Chemical Co., Ltd.) and 0.5 g of a chloroplatinic acid catalyst (1% solution of chloroplatinic acid). To this solution was added 2.05 g of expanded graphite. The impregnated graphite was dried in a vacuum oven at 100° C. for about 30 minutes and then heated in air at 200° C. for one hour for heat curing. This was heated to 1,600° C. in an argon stream at a rate of about 300 K/hr, held at the temperature for one hour, then cooled at a rate of about 200 K/hr. There was obtained 36.9 g of a grayish black product in a yield of about 48% based on the siloxane weight. The results of chemical analysis of this product are shown in Table 1. From these analytical results and the charts of x-ray diffraction and solid NMR analysis, the product was identified to consist essentially of β-SiC. From the SEM photomicrograph and particle diameter measurement, the product was found to be fine particles having an average particle diameter of about 0.5 μm.

Example 4

Figure 4:
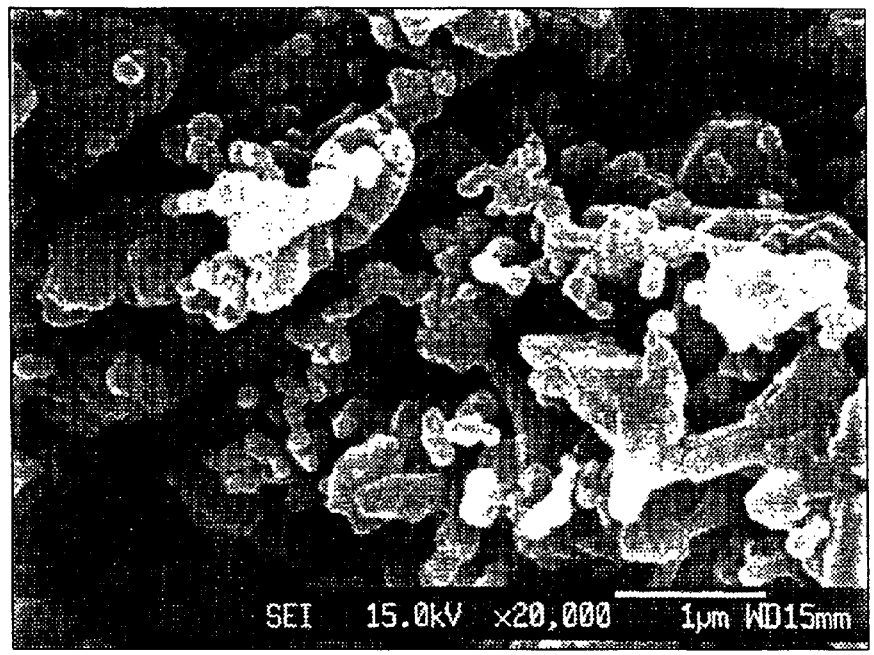

To a mixture of 100 g of methylphenyl family silicone varnish (KR-267 by Shin-Etsu Chemical Co., Ltd.) and 0.2 g of a chloroplatinic acid catalyst (1% solution of chloroplatinic acid) was added 2.0 g of expanded graphite. The impregnated graphite was heated in air at 200° C. for one hour. This was heated to 1,600° C. in an argon stream at a rate of about 300 K/hr, held at the temperature for one hour, then cooled at a rate of about 200 K/hr. There was obtained 18.5 g of a blackish gray product. The results of chemical analysis of this product were approximate to the theoretical values of silicon carbide. The presence of β-SiC was also confirmed by x-ray diffraction. FIG. 4 is a SEM photomicrograph of this product.

Comparative Example 1

To a solution of 74.0 g of a crosslinkable functional group-free dimethylsilicone oil (KF-96 by Shin-Etsu Chemical Co., Ltd., 10 centistokes) in 100 ml of toluene was added 2.05 g of expanded graphite. The impregnated graphite was dried in a vacuum oven at 100° C. for about 30 minutes and then heated in air at 200° C. for one hour. This was heated to 1,600° C. in an argon stream at a rate of about 300 K/hr, held at the temperature for one hour, then cooled at a rate of about 200 K/hr. There was merely obtained 3.5 g of a black product. The results of chemical analysis showed that the product was composed mainly of carbon and contained only about 5.5% of silicon.

Comparative Example 2

In 100 ml of toluene was dissolved a mixture of 43.0 g of tetramethyltetravinylcyclotetrasiloxane (LS-8670 by Shin-Etsu Chemical Co., Ltd.), 31.0 g of methylhydrogensiloxane (KF-99 by Shin-Etsu Chemical Co., Ltd.) and 0.5 g of a chloroplatinic acid catalyst (1% solution of chloroplatinic acid). To this solution was added 2.05 g of expanded graphite. The impregnated graphite was dried in a vacuum oven at 100° C. for about 30 minutes and then heated in air at 300° C. for one hour for heat curing. This was heated to 1,100° C. in an argon stream at a rate of about 300 K/hr, held at the temperature for one hour, then cooled at a rate of about 200 K/hr. There was obtained 4.3 g of a black product. The results of chemical analysis of this product showed that it was composed mainly of carbon and no SiC formed as shown in Table 1.

Comparative Example 3

In 100 ml of toluene was dissolved a mixture of 43.0 g of tetramethyltetravinylcyclotetrasiloxane (LS-8670 by Shin-Etsu Chemical Co., Ltd.) and 31.0 g of methylhydrogensiloxane (KF-99 by Shin-Etsu Chemical Co., Ltd.). To this solution was added 2.05 g of expanded graphite. The impregnated graphite was dried in a vacuum oven at 100° C. for about 30 minutes and then heated in air at 300° C. for one hour. This was heated to 1,600° C. in an argon stream at a rate of about 300 K/hr, held at the temperature for one hour, then cooled at a rate of about 200 K/hr. There was obtained 3.8 g of a black product. The results of chemical analysis of this product showed that it was composed mainly of carbon and contained only about 6.0% of silicon.

TABLE 1

|  | Example | | | | Comparative Example | | |
| --- | --- | --- | --- | --- | --- | --- | --- |
|  | 1 | 2 | 3 | 4 | 1 | 2 | 3 |
| Starting siloxanes | Me(Vi)SiO Me(H)SiO | Me(Vi)SiO Me(H)SiO | Me$_2$(Vi)SiO Me(H)SiO | silicone resin* | Me$_2$SiO | Me(Vi)SiO Me(H)SiO | Me(Vi)SiO Me(H)SiO |
| Catalyst | Pt | Pt | Pt | Pt | none | Pt | none |
| Solvent | toluene | none | toluene | xylene | toluene | toluene | toluene |
| Heating temp. | 1600° C. | 1600° C. | 1600° C. | 1600° C. | 1600° C. | 1100° C. | 1600° C. |
| Yield (%) | 48 | 47 | 48 | 37 | <5 | <5 | <5 |
| Product appearance | grayish white | grayish white | grayish white | blackish gray | black | black | black |
| X-ray diffraction | β-SiC | β-SiC | β-SiC | β-SiC | amorphous | amorphous | amorphous |
| Composition analysis |  |  |  |  |  |  |  |
| Si (%) | 65 | 67 | 65 | 63 | 5.5 | 5.0 | 6.0 |
| C (%) | 30 | 32 | 32 | 33 | 90 | 92 | 90 |
| O (%) | 2.0 | 1.9 | 1.5 | 2.3 | 1.0 | 1.0 | 0.8 |

*(Me$_2$SiO)(MeSiO$_{2/3}$)(PhSiO$_{2/3}$) family silicone resin

The invention enables industrial manufacture of fine silicon carbide powder in a stable manner and at a low cost, by eliminating any special steps except for low-temperature heat treatment in air and high-temperature heat treatment in an inert gas.

Japanese Patent Application No. 2001-072349 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A method for preparing a fine β-silicon carbide powder, comprising the steps of:

impregnating graphite with at least one organosilicon compound selected from crosslinkable silanes and siloxanes, causing the organosilicon compound to crosslink within the graphite, and heating at a temperature of at least 1,300° C. in an inert gas stream for reaction.

2. The method of claim 1 wherein the heating step is carried out in the presence of a metal of Group VIII in the Periodic Table or a compound thereof as a catalyst.

3. The method of claim 1 wherein the organosilicon compound has the average formula:

$$C_a H_b SiO_c$$

wherein $a$ and $b$ are positive numbers and $c$ is 0 or a positive number, satisfying $a-c \geq 0.8$.

4. The method of claim 1 wherein the graphite is expanded graphite.

* * * * *